United States Patent
Potz et al.

[11] Patent Number: 5,788,161
[45] Date of Patent: Aug. 4, 1998

[54] FUEL INJECTION NOZZLE FOR INTERNAL COMBUSTION ENGINES

[75] Inventors: Detlev Potz, Stuttgart; Guenter Lewentz, Hemmingen; Uwe Gordon, Markgroeningen; Stefan Haug, Leinfelden-Echterdingen, all of Germany

[73] Assignee: Robert Bosch GmbH, Stuttgart, Germany

[21] Appl. No.: 564,214
[22] PCT Filed: Mar. 24, 1995
[86] PCT No.: PCT/DE95/00407
§ 371 Date: Dec. 15, 1995
§ 102(e) Date: Dec. 15, 1995
[87] PCT Pub. No.: WO95/28561
PCT Pub. Date: Oct. 26, 1995

[30] Foreign Application Priority Data

Apr. 15, 1994 [DE] Germany ............ 44 13 217.4

[51] Int. Cl.$^6$ ............................................. B05B 1/30
[52] U.S. Cl. .................... 239/533.13; 239/533.14; 239/596
[58] Field of Search .................. 239/533.1–533.14, 239/585.11, 585.2, 585.3, 585.4, 585.5, 596, 584

[56] References Cited

U.S. PATENT DOCUMENTS

| | | |
|---|---|---|
| 1,589,245 | 6/1926 | Scott ............................ 239/533.14 |
| 2,965,311 | 12/1960 | Gascoigne ..................... 239/533.13 |
| 3,827,638 | 8/1974 | Halvorsen ....................... 239/533.13 |
| 3,831,860 | 8/1974 | Gullaksen et al. ............... 239/504 |
| 4,013,229 | 3/1977 | Rohs .............................. 239/533.14 |
| 4,628,576 | 12/1986 | Gianchino et al. ............. 29/157.1 R |
| 4,647,013 | 3/1987 | Giachino et al. ............... 239/102 |
| 4,907,748 | 3/1990 | Gardner et al. ................ 239/584 |
| 5,193,743 | 3/1993 | Romann et al. ................ 239/1 |
| 5,323,966 | 6/1994 | Buchholz et al. .............. 239/408 |

Primary Examiner—Andres Kashnikow
Assistant Examiner—Lisa Ann Douglas
Attorney, Agent, or Firm—Edwin E. Greigg; Ronald E. Greigg

[57] ABSTRACT

A fuel injection nozzle for internal combustion engines has a holding body with a protruding fixed nozzle needle whose terminal portion, has a valve cone, an annular valve diaphragm cooperates in valve-like fashion. The valve diaphragm is fastened by its outer peripheral portion against the holding body with a union nut, and the edge surrounding the opening is resiliently pressed with initial tension against the valve cone. In order to keep the strains occurring in the stroke, generated by bending, of the valve diaphragm low over its entire region, the valve diaphragm has a bulge oriented counter to the stroke direction. The bulge is preferably composed of an annular region of steep slope ($\alpha$) adjoining the fastened outer peripheral region, and an annular region of flat slope ($\beta$) extending from it toward the opening. The bulge may also be conical or dome-shaped. In order to limit the stroke of the valve diaphragm, a stroke stop shim is provided, which is firmly fastened to the holding body, together with the valve diaphragm, by the union nut. The form of the injection stream is varied by the form of the end portion of the nozzle needle and the form of the flow opening of the stroke stop disk.

20 Claims, 9 Drawing Sheets

FUEL INJECTION NOZZLE FOR INTERNAL COMBUSTION ENGINES

PRIOR ART

The invention is based on a fuel injection nozzle for internal combustion engines. In a fuel injection nozzle of this kind, known for instance from U.S. Pat. No. 1,589,239, the resilient valve diaphragm is embodied as a flat disk, with a reinforcement in the form of a hub that defines the flow opening. The outer peripheral region of the diaphragm is fastened firmly against the retaining body with a union nut, so that the diaphragm rests by an annular edge of the flow opening of a certain prestressing, which defines the opening pressure, on the valve cone of the nozzle needle, which protrudes axially into the pressure chamber of the holding body. When fuel is supplied and a pressure is built up in the pressure chamber, the diaphragm bulges away from the nozzle needle toward the combustion chamber, so that the peripheral edge of the flow opening lifts away from the nozzle needle valve cone and uncovers an annular valve gap. The hub that defines the flow opening is disposed on the perforated diaphragm in the form of a reinforcement, so that the bending or bulging is concentrated not only on the region near the flow opening but rather is distributed over the entire surface area. This embodiment of the diaphragm still leaves something to be desired in terms of durability, however, since each time the diaphragm bulges, very high strains arise in the annular region adjoining the fastened outer region.

German Democratic Republic Patent Disclosure DD-A 1 803 has also disclosed a fuel injection nozzle with a resilient, peripherally fastened valve diaphragm, whose inner peripheral region surrounding the flow opening cooperates in valvelike fashion with a nozzle needle. To prevent the valve diaphragm from tearing at the flow opening even after relatively long operation, the inner peripheral region forming the seat region is formed by an extrusion in the opposite direction of the injection direction, and the annular region adjoining it toward the outside is reinforced by a resilient annular disk. In this form of valve diaphragm as well, high strains occur near the fastened outer peripheral region and impair the durability of the valve diaphragm.

ADVANTAGES OF THE INVENTION

The fuel injection nozzle according to the invention having the characteristics of the body of claim 1 has the advantage that because of the bulging of the valve diaphragm in the direction counter to that in which pressure is imposed, no critical strains occur in the diaphragm upon valve opening by bending counter to the bulging over the entire region. Because the resilience is limited to a certain amount, the strains remain within a certain limit range, and so the diaphragm has very high fatigue strength under compressive strains, making for a long useful life.

As a result of how the bulge is embodied, the annular region, which adjoins the fastened outer peripheral region and rises steeply toward the pressure chamber, and the flatly rising inner region prevent the generation of impermissibly high peak strains, so that the fatigue life of the valve diaphragm is increased substantially. This is achieved because at the critical points, dictated by geometry, non-critical compressive strains are superimposed on the critical tensile strains.

By means of the provisions recited hereinafter, advantageous features and improvements of the fuel injection nozzle are possible.

BRIEF DESCRIPTION OF THE DRAWINGS

Exemplary embodiments of the invention are shown in the drawing and will be described in detail below.

DETAILED DESCRIPTION OF THE EXEMPLARY EMBODIMENTS

Figure 1:
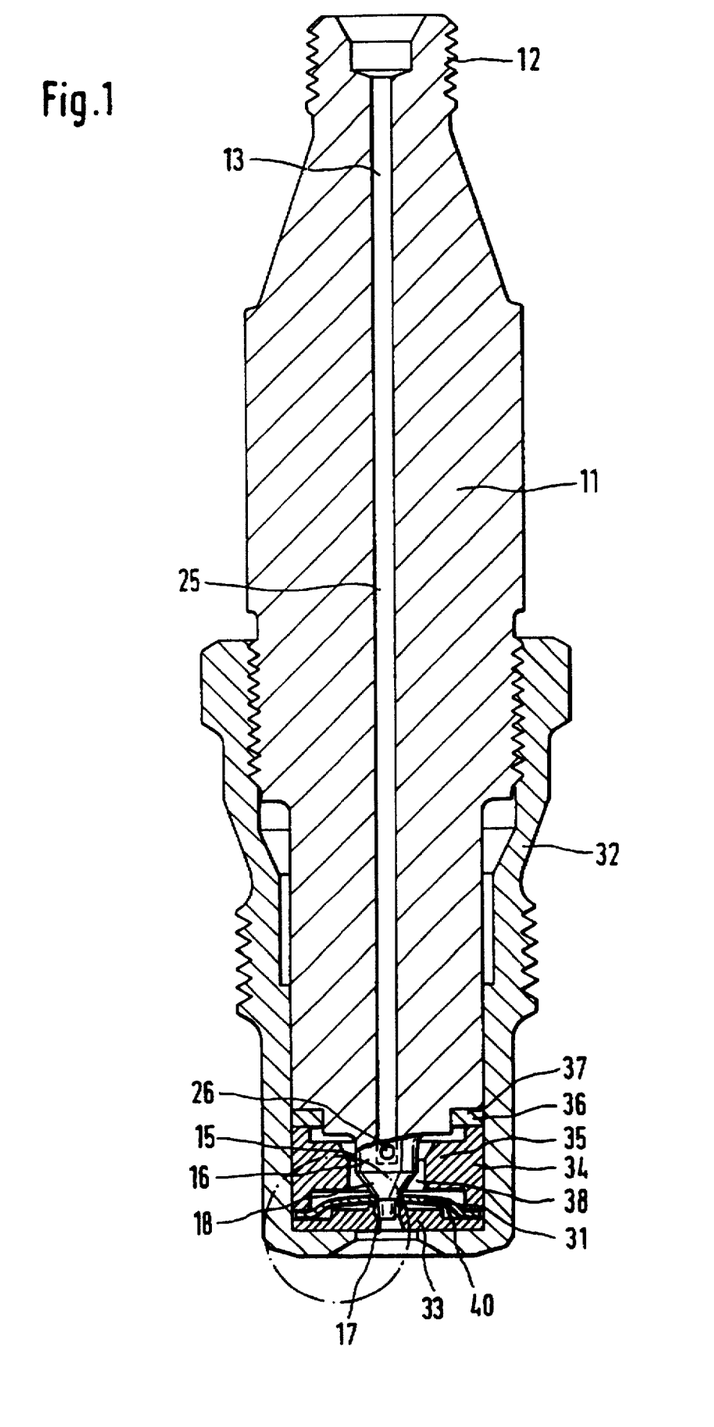
FIG. 1 shows a fuel injection nozzle in longitudinal section.

A rotationally symmetrical holding body 11 has a connection 12, on its inlet end, for a fuel supply line; a continuous axial inlet conduit 13; and, on its end toward the combustion chamber, an axially protruding nozzle needle 15. The nozzle needle 15 itself has a cylindrical portion 16 and an adjoining terminal portion 17 with a valve cone 18 and a stream-shaping tang 19.

In the exemplary embodiment of FIG. 1, the nozzle needle 15 is integrally connecting to the holding body 11. Conversely, in the exemplary embodiment of FIG. 2, the nozzle needle 15 has a threaded shaft 21, with which it is axially adjustably screwed into a threaded bore 22 in the holding body 11. In the exemplary embodiment of FIG. 3, the nozzle needle 15 is elongated and is inserted displaceably in a through bore 23 of the holding body 11. It is axially adjusted in the connection portion of the holding body 11 with a set screw 24. The inlet conduit 13, in the exemplary embodiment of FIG. 1, comprises an axial blind bore 25 and a transverse bore 26 in the cylindrical portion 16 of the nozzle needle 15. In the exemplary embodiment of FIG. 2, the inlet conduit 13 extends through the holding body 11 and an axial blind bore in the threaded shaft 21 as well as through a transverse bore 26 in the cylindrical portion 16 of the nozzle needle 15. Analogously, in the exemplary embodiment of FIG. 3, the inlet conduit 13 extends from the connection 12 of the holding body 11 axially through the hollow set screw 24 and the elongated shaft of the nozzle needle 15 and again discharges through the transverse bore 26 in the cylindrical portion of the nozzle needle 15.

Figure 2:
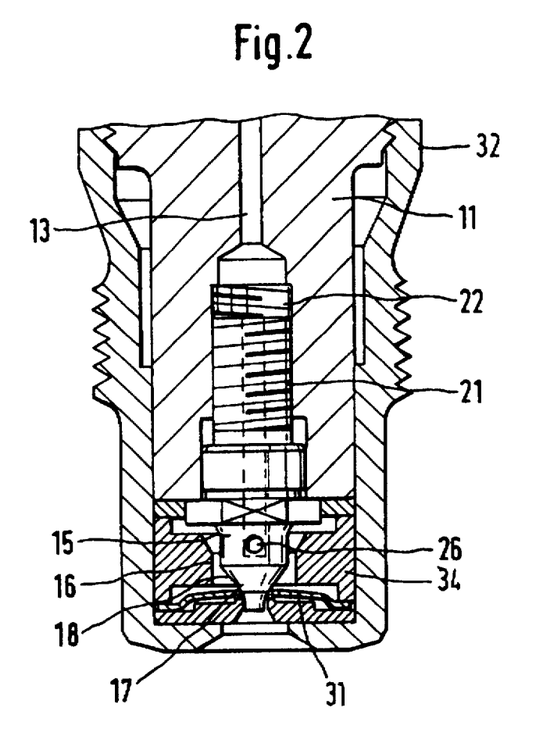
FIGS. 2 and 3 show two alternative exemplary embodiments of a fuel injection nozzle with an adjustable nozzle needle in longitudinal section.
Figure 3:
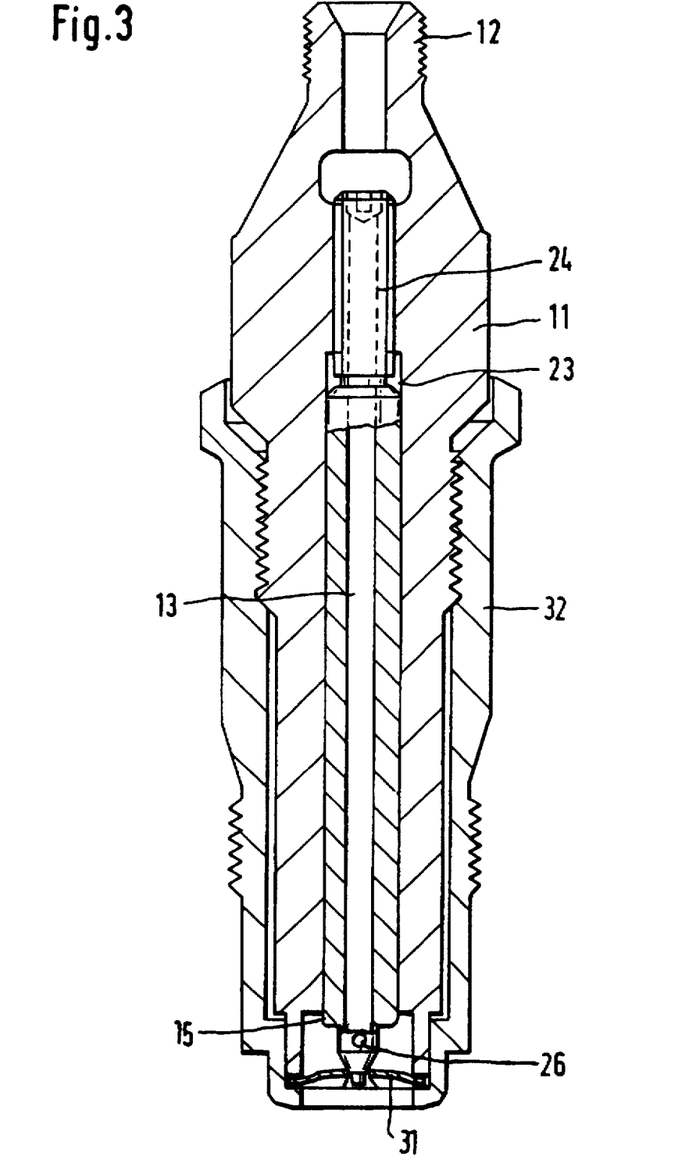

An annular valve diaphragm 31 cooperates with the valve cone 18 of the nozzle needle 15; this valve diaphragm is firmly fastened by its outer peripheral region 41 to the holding body 11 by means of a union nut 32, and with its inner edge 49 defining a flow opening 39 it rests sealingly with initial tension on the valve cone 18 of the nozzle needle 15. The union nut 32 tightens the valve diaphragm 31, with the interposition of a stroke stop washer 33 on one side and a spacer sleeve 34 and a compensating washer 36 on the other side against a shoulder 37 on the end toward the combustion chamber of the holding body 11. The particular thickness of the compensating washer 36 determines the initial tension and hence the contact pressure or opening pressure of the valve diaphragm 31 on the valve cone 18. The cylindrical portion 16 and the valve cone 18 of the nozzle needle 15, together with the valve diaphragm 31, the spacer sleeve 34 and the shoulder 37 of the holding body 11, define a pressure chamber 38, into which the inlet conduit 13 discharges. In order to keep the idle volume of this pressure chamber 38 small, the spacer sleeve 34 has an inner collar 35.

To increase its fatigue strength, the valve diaphragm 31 has a bulge 40 oriented into the pressure chamber 38. In the exemplary embodiments of FIGS. 1–4, this bulge 40 is composed of an annular region 42, adjoining the flat, fastened outer peripheral region 41, and an inner region 43 defined by the opening 39. The annular region 42 that adjoins the outer peripheral region 41 via a rounded transition 44 has a clearance angle α of 40° to 80°, preferably 65°, and the inner region adjoining it via a rounded portion 45 has a clearance angle β in the range of 3° to 10°, preferably 5°. In the case of the diaphragm disk 31, the annular region 42 takes the form of a low, steeply sloping truncated cone, and the inner region 43 takes the form of a flat truncated cone, with the transitions 44, 45 being rounded.

Figure 4:
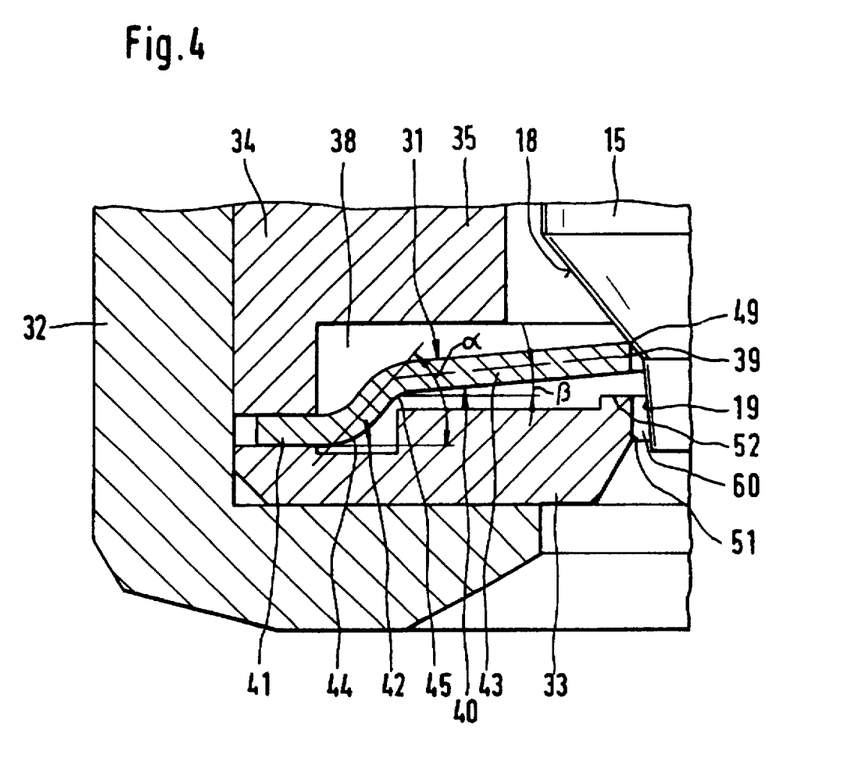
FIG. 4 shows the valve region of the fuel injection nozzle of FIGS. 1–3 in section on a larger scale.
Figure 5:
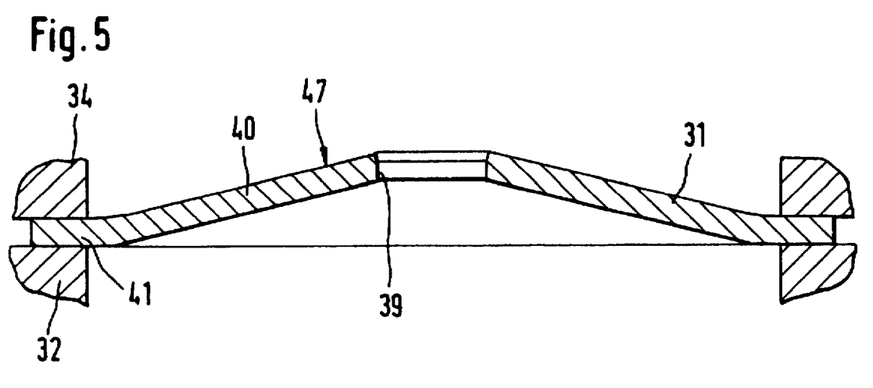
FIGS. 5–7 show three alternatively shaped valve d iaphragms in cross section.
Figure 6:
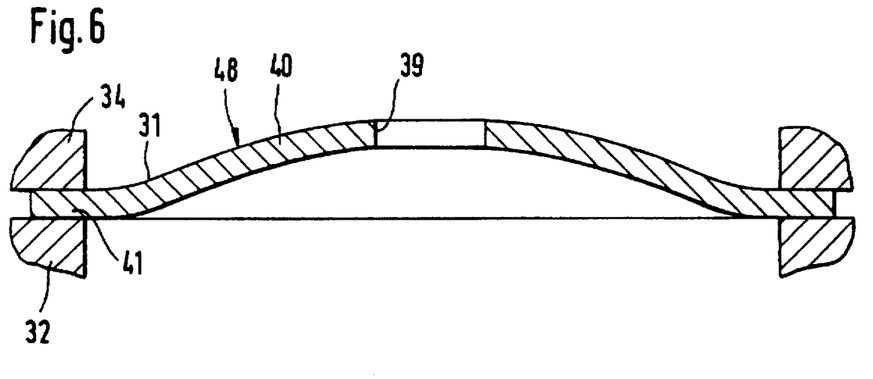
Figure 7:
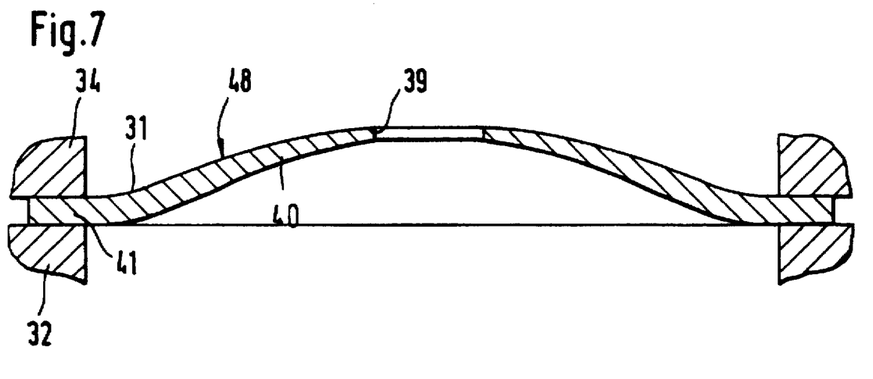

As FIGS. 5–7 show, the bulge 40 of the valve diaphragm 31 can take the form of a single flat truncated cone 47 or of a cupola or dome 48; the truncated cone 47 or dome 48 adjoin the fastened outer peripheral region 41 of the valve diaphragm 31. In the exemplary embodiments of FIGS. 4–6, the valve diaphragm 31 has an essentially uniform thickness. Conversely, in the exemplary embodiment of FIG. 7, the thickness of the valve diaphragm 31 increases, adjoining the outer peripheral region 41, toward the opening 39.

In the pressureless state, or in other words when no pressure prevails in the pressure chamber 38, the edge or peripheral edge 49 defining the opening 39 of the valve diaphragm 31 rests tightly, under a certain initial tension, on the valve cone 18 of the nozzle needle 15. As fuel is fed into the pressure chamber 38, a pressure builds up therein, on the basis of which the free inner region 43 of the valve diaphragm 31 is bent resiliently in the direction of the combustion chamber, after the initial tension is overcome, causing the peripheral edge 49 defining the opening 39 to lift away from the valve cone 18. An annular flow gap thus forms between the peripheral edge 49 and the valve cone 18, so that fuel is injected out of the pressure chamber into the engine combustion chamber. As the feed pressure drops, the valve diaphragm 31 springs back again and presses with the peripheral edge 49 of its opening 39 tightly against the valve cone 18 again.

Figure 8:
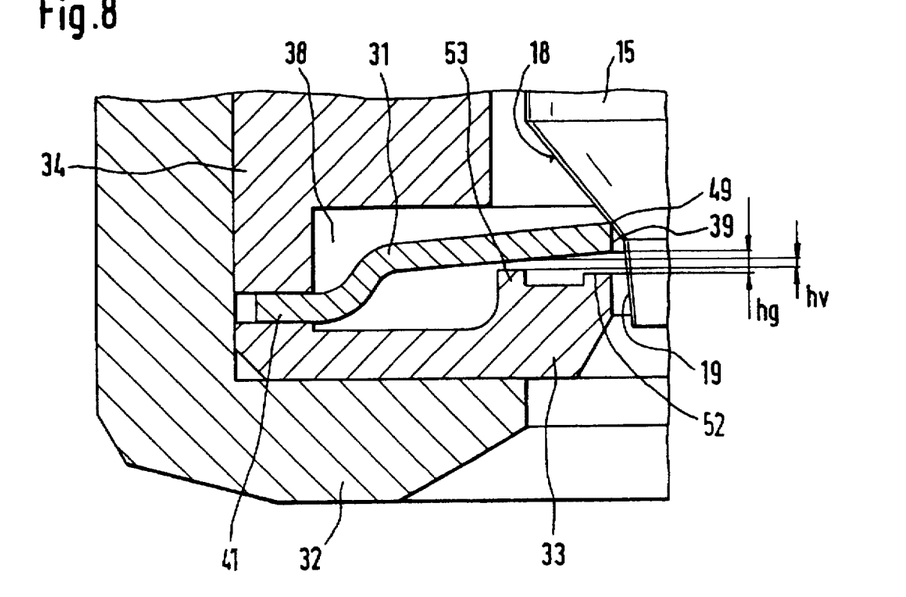
FIGS. 8–13 show alternative features of the valve region and the associated diagrams of the opening characteristic of fuel injection nozzles of FIGS. 1–3.
Figure 9:
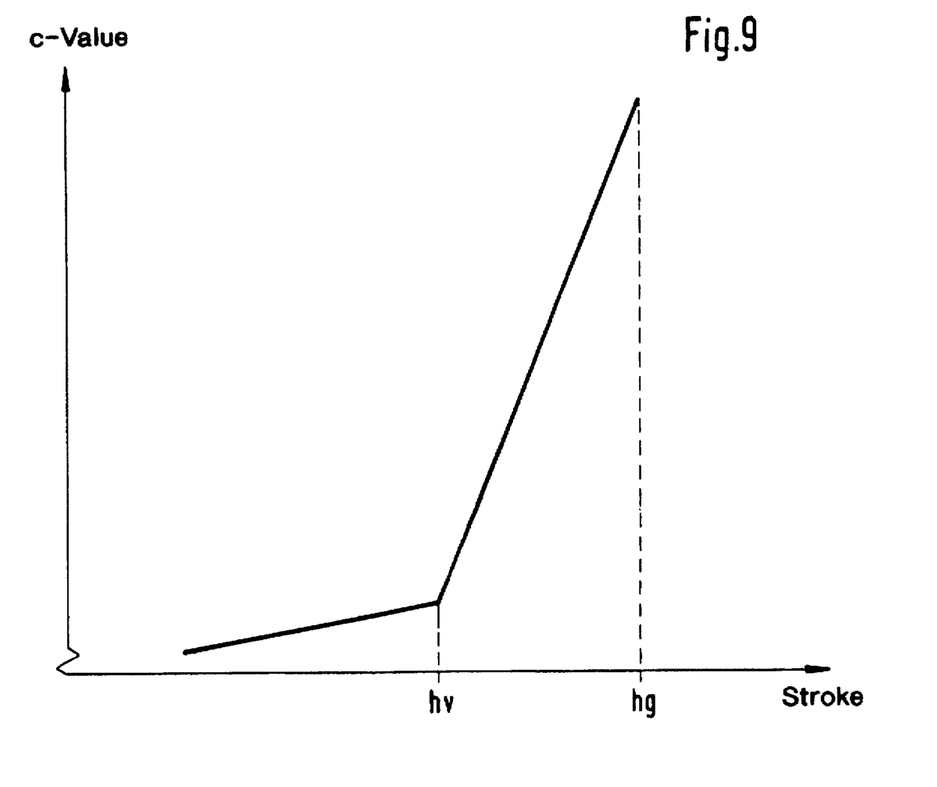

To vary the opening cross section of the nozzle and define it, stops are provided on the stroke stop washer 33, which is essentially coincident with the valve diaphragm 31 and which has a flow opening 51 that is substantially concentric to the opening 39 of the diaphragm. In the exemplary embodiment of FIG. 4, the opening characteristic and hence the shaping of the course of the cross section are determined by the intrinsic rigidity—the C value—of the resilient valve diaphragm 31. The maximum stroke h is determined by a stop 52, which protrudes axially toward the valve diaphragm 31 from the inner peripheral region, defining the flow opening 51, of the stroke stop washer 33. The C value of the valve diaphragm 31 can also be varied by means of a second stop 53 (FIGS. 8 and 9) in such a way that the valve diaphragm (31), after a prestroke $h_v$, initially rests, with an annular region located radially farther outward from the opening 39, on the second stop 53 located radially farther outward from the first stop 52, so that subsequently the radially inner annular region from it is further bent, with a shortened bending length, for further opening of the flow gap until after the total stroke $h_g$ it comes to rest on the inner stop 52. The abrupt increase in the C value of the valve diaphragm 31 can be seen from FIG. 9. The embodiment shown has the result that when the partial stroke stop 53 is reached, the pressure in the pressure chamber 38 must rise markedly in order to achieve a further stroke and hence a further increase in the injection cross section. This effect is further reinforced because the hydraulically active area of the valve diaphragm 31 decreases sharply when the partial stroke stop 53 is reached.

Figure 10:
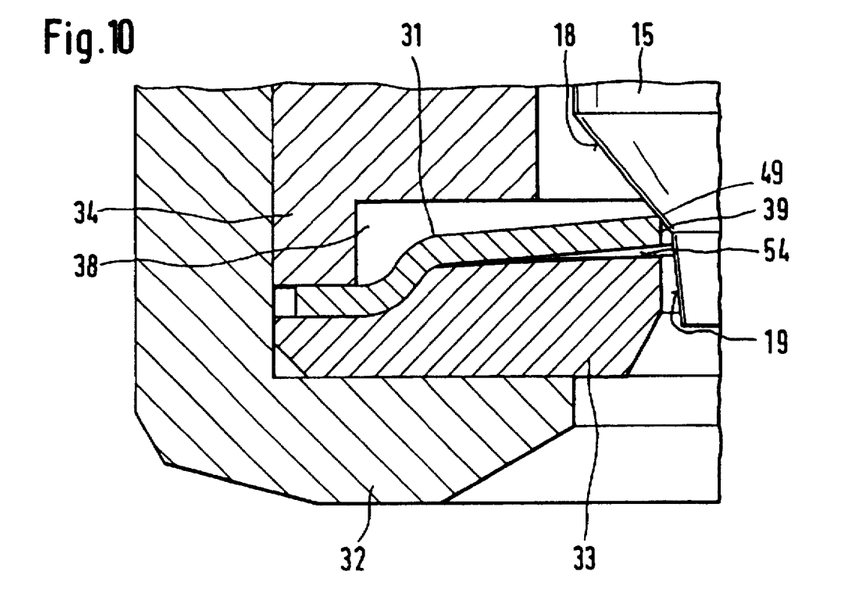
Figure 11:
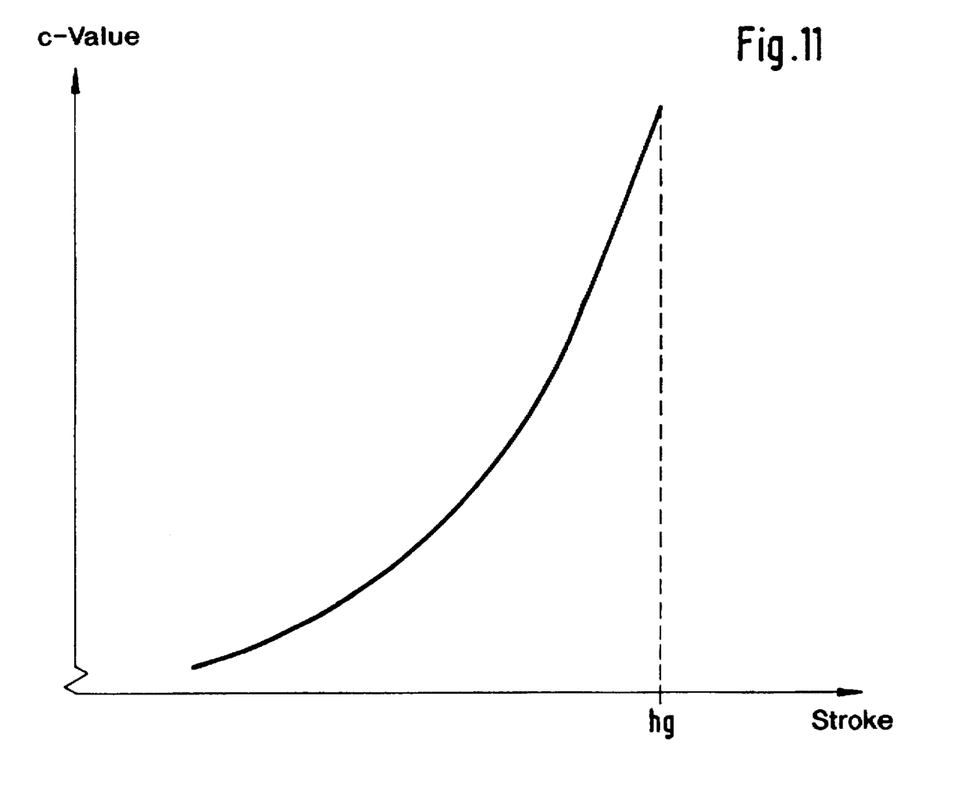

Instead of the abrupt increase in the C value of the valve diaphragm 31 as described by means of a partial stroke stop 53, this value can also be made to increase progressively. This is accomplished by providing that the stroke stop washer 33 has, instead of individual stops, a curved stop face 54 (FIGS. 10, 11), so that the valve diaphragm 31 upon the stroke comes increasingly from the outside inward to rest with its inner region (43) on the stroke stop washer 33. The contour of the stroke stop face 54 is embodied as a function of the form of the bulge 40 of the valve diaphragm 31 and of the desired opening characteristic.

Figure 12:
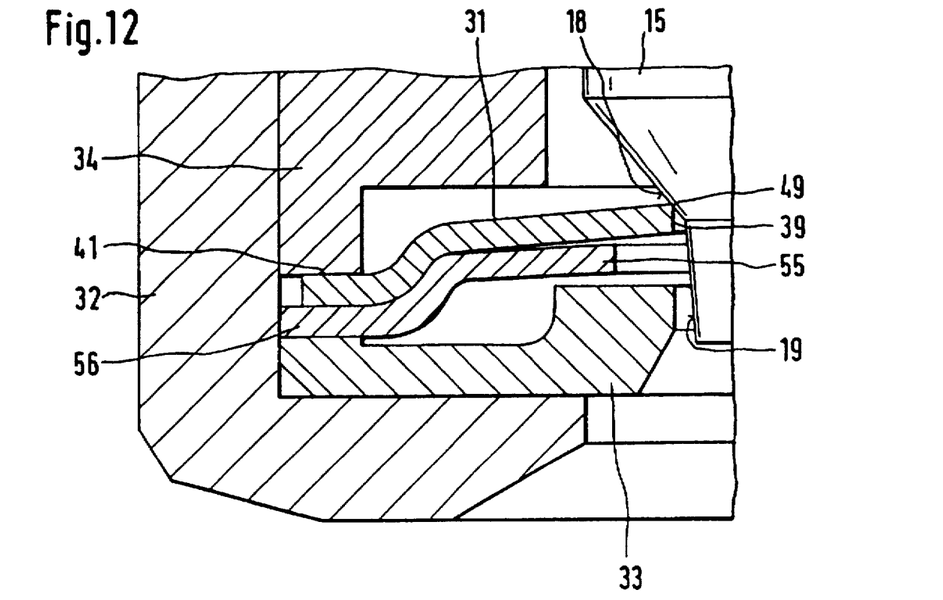
Figure 13:
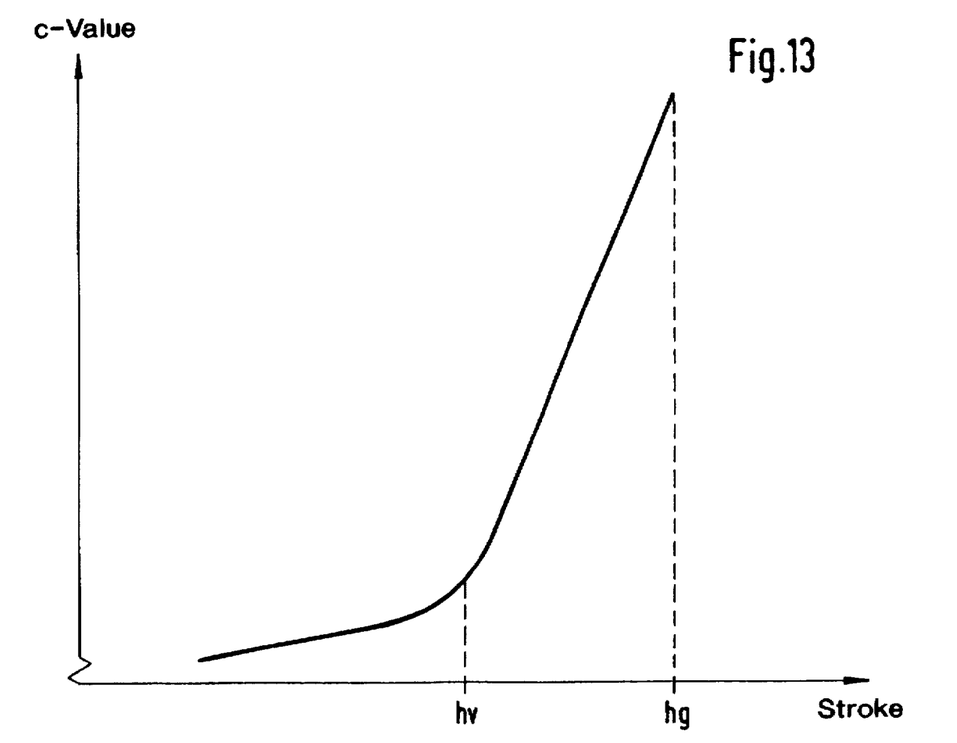

A further possible way to vary the opening characteristic is, as shown in FIGS. 12 and 13, for the valve diaphragm 31 to be underlaid with a spring washer 55, which is fastened by its outer peripheral region 56 to the outer peripheral region 41 of the valve diaphragm.31. Instead of a single spring washer, a plurality of them may also be provided. Moreover, the C value can be varied by means of the shape of the spring washer. Depending on the desired opening characteristic of the fuel injection nozzle, the embodiments can conceivably be in multiple stages or in infinitely graduated stages or may have a combination of these two features.

For the shaping of the injection cross section and its course, not only the stroke of the valve diaphragm 34 but also the shape of the closing cone 18 of the stationary valve needle 18 is decisive. That is, the more obtuse the cone angle of the closing cone 18, the larger the flow or injection cross section for the same stroke.

The valve cone 18 may be embodied as an injection cone, truncated cone, hemisphere, or similar shapes. Moreover, the opening 39 of the valve diaphragm 31 may be embodied cylindrically or conically, widening or narrowing in the injection direction. To form a certain cross-sectional course shaping, the terminal portion that penetrates the opening 39 of the valve diaphragm 31 is shaped in such a way that upon the stroke of the valve diaphragm, varying flow cross sections between the circumference of the openings 39 and the circumference of the terminal portion 17 are produced.

Figure 14:
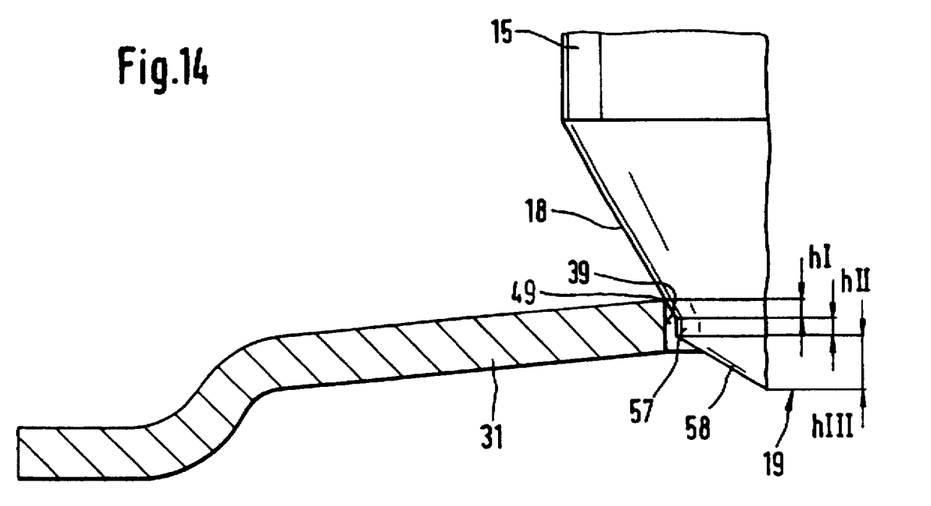
FIGS. 14 and 15 show an alternative feature of the nozzle needle in the valve region and the associated injection cross section diagram.
Figure 15:
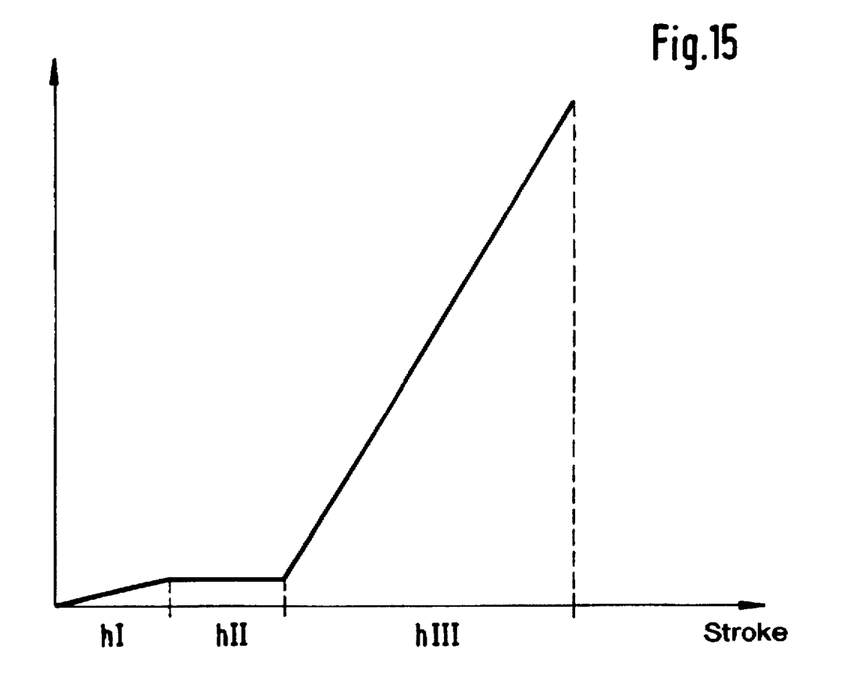

In the above-described exemplary embodiments, the valve cone 18 is adjoined by a stream-shaping tang 19, in the form of a truncated cone with a steep cone angle, with the diameter at the root of the truncated cone being smaller than the diameter of the opening 39 of the valve diaphragm 31. As shown in the exemplary embodiment of FIG. 14, a cylindrical portion 57 can adjoin the closing cone 18, at the interval of a prestroke, in the region of the stroke of the valve diaphragm 31 beginning at the circular-line-shaped seat on the cone, and that cylindrical portion can in turn be adjoined by a frustoconical portion 58. As can be seen from the diagram of FIG. 15, the injection cross section F increases slowly in the prestroke $h_I$. If the peripheral edge 49 of the valve diaphragm 31 thereupon overtakes the end of the closing cone 18, the injection cross section remains constant in a partial stroke $h_{II}$ during the overtaking of the cylindrical extension 57 and rapidly increases in the partial stroke $h_{III}$ upon the overtaking of the frustoconical portion 58.

In order moreover to lend the injection stream a desired form, which also has substantial importance for combustion, a straight-shot conduit 60 is formed downstream of the valve formed by the valve diaphragm 31 and valve cone 18; this conduit is defined by the central flow opening 51 of the stroke stop washer 33 and by the tang 19 penetrating it (FIG. 4). The flow opening 51 in the stroke stop washer 33 is preferably embodied cylindrically. The tang 19 preferably takes the form of a truncated cone, tapering in the injection direction, with a very steep cone angle. Depending on the cone angle of the tang 19, the angle of scattering of the conical injection stream is varied. The penetration depth of the stream is varied by way of the length of the straight-shot conduit 60. The length of the flow opening 51 is therefore 0.5 to 1.5 times the diameter of the needle tang 19.

In order that the concentricity between the straight-shot conduit 60 and the needle tang 19, which is important for the symmetry of the stream, is assured, an exact alignment is performed via the outer diameter of the stroke stop washer 33. In order to assure that a concentric circular cross section is also created between the needle tang 19 and the valve diaphragm 31, the outer diameter of the valve diaphragm 31 is smaller than the inside diameter of the tightening nut 32. This assures that in assembly, an exact alignment of the injection port takes place by self centering by means of the valve cone 18.

The foregoing relates to preferred exemplary embodiments of the invention, it being understood that other variants and embodiments thereof are possible within the spirit and scope of the invention, the latter being defined by the appended claims.

We claim:

1. A fuel injection nozzle for internal combustion engines with a combustion chamber, having a holding body in whose end portion toward the combustion chamber an annular pressure chamber communicating with an inlet conduit is disposed; a nozzle needle, which defines the pressure chamber radially on an inside and has a closing cone with a valve seat and said nozzle needle is connected firmly to the holding body; a valve diaphragm, which defines the pressure chamber toward the combustion chamber and is firmly fastened by its peripheral region to the holding body, wherein the diaphragm has a central opening (39) and a peripheral edge that surrounds the opening rests sealingly under tension on the valve cone of the nozzle needle in a closing position of the valve diaphragm, and the valve cone protrudes into the opening of the diaphragm, the valve diaphragm (31) has a convex bulge (40) oriented toward the pressure chamber (38), and said bulge adjoins a firmly fastened outer peripheral region (41).

2. The fuel injection nozzle of claim 1, in which an annular region (42) of said diaphragm, adjoins the outer peripheral regions (41), adjoins the valve diaphragm (31) at a comparatively steep clearance angle ($\alpha$), and an inner region (43) of said diaphragm, adjacent to the annular region (42) and defined by the opening (39), has a relatively flat clearance angle ($\beta$).

3. The fuel injection nozzle of claim 2, in which the thickness of the valve diaphragm is substantially uniform.

4. The fuel injection nozzle of claim 2, in which a thickness of the valve diaphragm (31) decreases from the outer peripheral region (41) toward the opening (39).

5. The fuel injection nozzle of claim 2, in which a stroke of the valve diaphragm (31) is limited by a stop (52).

6. The fuel injection nozzle of claim 1, in which the bulge (40) takes the form of a truncated cone (47) or a dome (48).

7. The fuel injection nozzle of claim 1, in which the thickness of the valve diaphragm is substantially uniform.

8. The fuel injection nozzle of claim 1, in which a thickness of the valve diaphragm (31) decreases from the outer peripheral region (41) toward the opening (39).

9. The fuel injection nozzle of claim 1, in which a stroke of the valve diaphragm (31) is limited by a stop (52).

10. The fuel injection nozzle of claim 9, in which at least one second stop (53) is disposed between the stop (52) and the fastening point of the valve diaphragm (31).

11. The fuel injection nozzle of claim 10, in which the first and second stops (52, 53) merge with one another in a generally flat fashion.

12. The fuel injection nozzle of claim 9, in which the stop (52, 53) is disposed on a stroke stop washer (33), which on the combustion chamber side braced together with the valve diaphragm (31) on the holding body (11) by means of a union nut (32).

13. The fuel injection nozzle of claim 12, in which the stroke stop washer (33) has a central flow opening (51), which is disposed in coincidence with the opening (39) of the valve diaphragm (31) and is pierced by a stream-shaping tang (10), which adjoins the valve cone (18) of the nozzle needle (15).

14. The fuel injection nozzle of claim 13, in which the stream-shaping tang (19) takes the form of a truncated cone with a steep cone angle.

15. The fuel injection nozzle of claim 13, in which the stream-shaping tang (19) is composed of a cylindrical portion (57) and a frustoconical portion (58).

16. The fuel injection nozzle of claim 13, in which the length of the flow opening (51) of the stroke stop washer (33) is from 0.5 to 1.5 times the diameter of the stream-shaping tang (19).

17. The fuel injection nozzle of claim 16, in which the stream-shaping tang (19) takes the form of a truncated cone with a steep cone angle.

18. The fuel injection nozzle of claim 16, in which the stream-shaping tang (19) is composed of a cylindrical portion (57) and a frustoconical portion (58).

19. The fuel injection nozzle of claim 1, in which the valve diaphragm (31) is reinforced by a spring washer (55).

20. The fuel injection nozzle of claim 1, in which a fastening point of the valve diaphragm (31) is formed by a hollow-cylindrical collar, which merges integrally with the valve diaphragm (31).

* * * * *